United States Patent

Abrams et al.

[15] 3,654,466

[45] Apr. 4, 1972

[54] NARROW BAND ELECTROMAGNETIC, PYROELECTRIC RADIATION DEVICES USING PIEZOELECTRIC DETECTORS

[72] Inventors: Richard Lee Abrams, Morris Township, Morris County; Alastair Malcolm Glass, Murray Hill, both of N.J.

[73] Assignee: Bell Telephone Laboratories, Incorporated, Murray Hill, N.J.

[22] Filed: May 7, 1970

[21] Appl. No.: 35,131

[52] U.S. Cl. ..........................250/83.3 H, 73/362 R, 136/213

[51] Int. Cl. ..........................G01j 5/10

[58] Field of Search ..........................250/83.3 H, 83 R, 355; 73/362 R; 325/363; 331/66; 136/213

[56] References Cited

UNITED STATES PATENTS 3,254,222 5/1966 Hudson ..........................250/83.3 H 3,519,924 7/1970 Burton ..........................331/66 X

*Primary Examiner*—Morton J. Frome

*Attorney*—R. J. Guenther and Edwin B. Cave

[57] ABSTRACT

Radiation detection is accomplished by sensing the piezoelectric response to the expansion and contraction in a crystal element due to the heating effect of the carrier energy to be sensed. Sensitivity to a subcarrier is enhanced by utilizing a frequency (of interrupted or continuous wave subcarrier) corresponding with a mechanical resonance frequency of the crystal element. The device is analogous to a conventional resonant r.f. detector element. Uses to which such prior art devices are applied may also be served with the class of inventive devices. Such uses include frequency standards, channel selectors, etc.

12 Claims, 5 Drawing Figures

PATENTED APR 4 1972 3,654,466

INVENTORS: R. L. ABRAMS
A. M. GLASS
BY George S. Indig
ATTORNEY

NARROW BAND ELECTROMAGNETIC, PYROELECTRIC RADIATION DEVICES USING PIEZOELECTRIC DETECTORS

BACKGROUND OF THE INVENTION

1. Field of the Invention

The invention is concerned with detectors for modulated electromagnetic radiation. Modulation may take the form of a pulse stream as, for example, in a PCM system or of a continuous modulated wave, for example, sinusoidal character.

2. Description of the Prior Art

Various contemplated uses for the rapidly developing laser technology have given impetus to the development of a variety of circuit elements including detectors. Generally, there are now available detectors operating on a variety of principles which together are usefully applied to the detection of low-level signals of the infrared spectrum, the visible spectrum and part of the ultraviolet. Some such detectors operate on photoelectric principles, some as photoconductors and some as photovoltaic. Many, such as commercially available photomultipliers and ion implanted semiconductors, are extremely sensitive, have high frequency response for modulated signals and, from such standpoint, meet at least the electrical needs of contemplated systems.

In recent years, it has been observed that a detection limitation exists over most of the infrared spectrum. Semiconductor devices are adequate for many purposes but must be operated at cryogenic temperatures for needed sensitivity and response time. Bolometers, which depend on simple heating by the radiation to be detected, are generally limited both as to response time and signal level.

Recently, interest has been generated in a class of detectors operating on a pyroelectric principle. It has been recognized that such devices have the inherent advantage of responding to rate of change of temperature rather than to the temperature level itself. It has been observed that electrical response through the pyroelectric coupling to radiation heating is sufficiently sensitive for low level signals. Unfortunately, it has also been observed that response to pulsed or otherwise modulated signals was frequency limited—generally to frequencies of the order of 10 or 100 kHz.

A recent development has resulted in an increase in this frequency response time. It came about by the recognition that the frequency limit was due to piezoelectric "ringing" which produced an electrical signal at some natural resonance frequency signal of the pyroelectric crystal. This resonance is due to the oscillatory relaxation of the crystal which is set into motion by the thermal shock of the incoming radiation. This limitation in frequency response was first overcome by use of crystalline materials having sufficiently low acoustical Q to damp out the mechanical resonance, see *Applied Physics Letters*, Vol. 13, 147 (1968). A more recent approach has been to damp out the resonance by induced acoustic loss as by clamping, see copending U.S. application Ser. No. 35,309, filed May 7, 1970.

As promising as the pyroelectric work has been, it should nevertheless be recognized that the nature of the mechanism is generally to produce a broadband detector element. Particularly at infrared carrier wavelengths, the need for a narrow-band subcarrier element is unfulfilled. Such an element would be analogous to the piezoelectric detector element in use for so many years in conventional electrical circuitry. Uses for such an element sensitive to modulated electromagnetic radiation of narrow bandwidth would be analogous and would include simple detection, channel selection for multiplex systems, frequency standardization, etc.

SUMMARY OF THE INVENTION

Piezoelectric crystalline materials are made to operate as narrow-band detectors for subcarriers imposed on electromagnetic radiation carriers. Use is made of crystal dimensions resulting in mechanical resonances having frequencies corresponding with subcarrier frequencies. Carriers may be in the infrared as well as at higher or lower frequencies. While the invention is an outgrowth of work on the pyroelectric detector, it is no requirement that the inventive devices be pyroelectric. In fact, sensitivity to modulated radiation is due to that very characteristic which in the past has limited frequency response of broadband, pyroelectric detectors, i.e., to piezoelectric "ringing."

In accordance with the invention, response to the oscillatory expansion and contraction induced by modulated radiation is enhanced by use of crystal cuts producing resonance modes corresponding with the modulated frequency to be detected. While devices of the invention are characteristically "narrow band," i.e., of the order of 5 kHz. at typical modulation frequencies, response may be broadened by the usual expedient of lowering the acoustical Q. Modifications of devices, in accordance with the invention, may serve as detectors, as channel selectors, are frequency standards, as mixers and, in fact, may serve any purpose analogous to those served or contemplated for cut crystal resonators in conventional electrical circuitry.

Response enhancement, in accordance with the invention, is for the "modulation" energy on the radiation. Borrowing from communications terminology, this energy is referred to as the "subcarrier" and the radiation as the "carrier." Of course, the subcarrier may be modulated in any of the usual ways in turn. Reference to "narrow band" is concerned with the subcarrier modulation bandwidth. Such subcarrier modulation is no requirement of the invention which is advantageously adapted to be selective of a particular interrupted or continuous wave "subcarrier" to the exclusion of others. In such instance, the "subcarrier" may carry no information and the inventive element merely detects its presence.

DETAILED DESCRIPTION

1. The Figures

Figure 1:
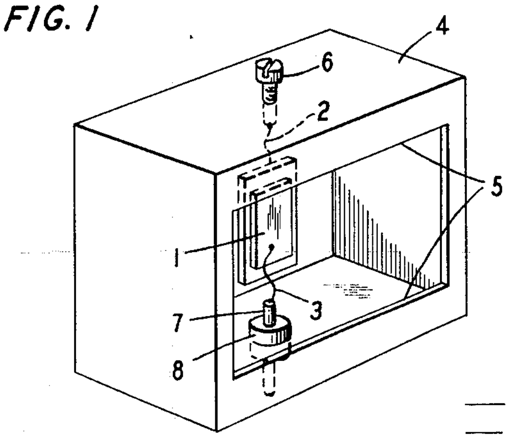
FIG. 1 is a perspective view, partly in section, of an illustrative detector in accordance with the invention.

Since the devices of the invention depend upon mechanical resonance, it is desirable that mounting structures offer minimal damping. In FIG. 1, piezoelectric detector element 1 is freely supported solely by electrical leads 2 and 3 suitably constructed of a compliant material. The cross section of such electrical leads is kept to a minimum and, for an illustrative detector 1 of sensitive area of the order of a few square millimeters, such wires may have a diameter of 1 mil and be constructed of copper. Damping is still further reduced by using bent leads. Detector 1 is enclosed within a metallic house 4 provided with a window area defined by aperture 5 through which radiation is introduced. The electrical circuit is completed by means of electrode members 6 and 7 to which wire leads 2 and 3 are attached. One such electrode member is grounded to housing 4 and the other is insulated therefrom by sleeve 8.

Figure 2:
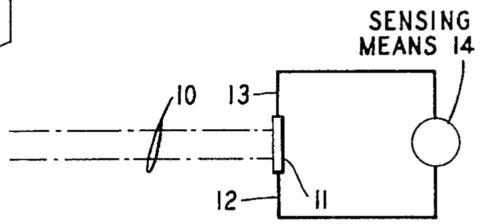
FIG. 2 is a diagrammatic view of a circuit utilizing a detector such as that depicted in FIG. 1.

In FIG. 2, the arrangement shown contemplates incoming modulated radiation, possibly of coherent energy, on beam 10 which is incident on detector 11. Detector 11 is provided with sensing leads 12 and 13 connected to sensing means 14. In the simplest possible embodiment, means 14 may simply be a potentiometer, or it may include ancillary apparatus such as a communications receiver adapted for converting the incoming a signal to a desired form.

Figure 3:
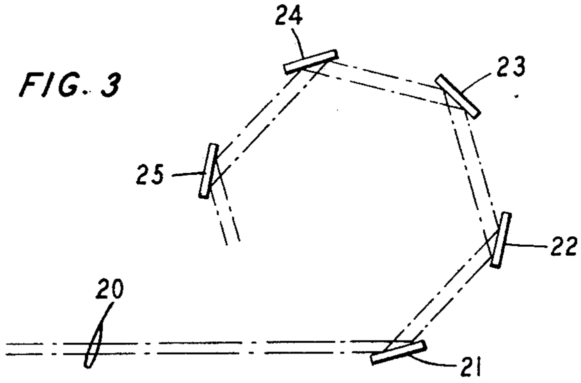
FIG. 3 is a diagrammatic view showing a circuit utilizing an array of the detectors of the invention, for example, for channel selection.

FIG. 3 depicts a frequency multiplex system. In accordance with this figure, incoming beam 20 contains several channels defined in terms of different frequency subcarriers (pulse trains or continuous wave). Modulation information, if present, may be introduced as amplitude, frequency or phase modulation. For the arrangement shown in this figure, detectors 21, 22, 23, 24 and 25, each having a mechanical resonance corresponding with a different channel, absorb a portion of the incoming radiation while reflecting the remainder so that it, in turn, becomes incident on a successive detector. Each detector is provided with circuitry and sensing means not shown.

Figures 4, 5:
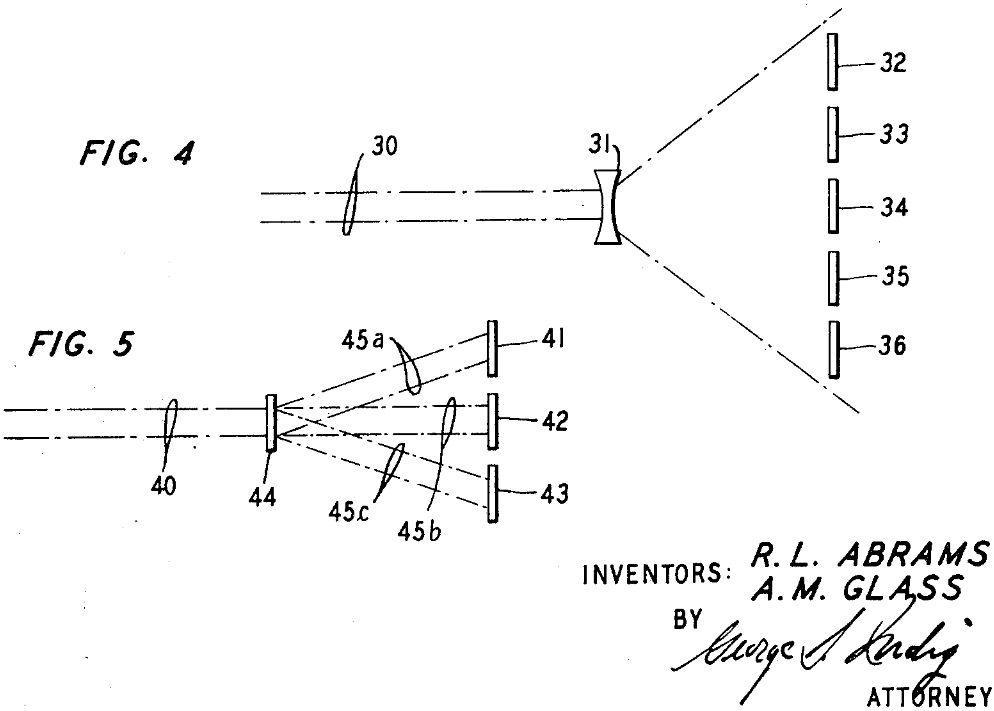
FIG. 4 is a schematic view of an arrangement alternative to that of FIG. 3.
FIG. 5 is a schematic view of yet a different arrangement alternative to that of FIG. 3.

The arrangement of FIG. 4 contemplates an incoming beam 30 which is multichanneled and may contain information of the form described in conjunction with FIG. 3. In this arrangement, the incoming beam is caused to diverge by concave lens 31 so as to simultaneously irradiate an array of elements 32, 33, 34, 35 and 36. As in the arrangement of FIG. 3, each of the elements 32 through 36 is "tuned" so as to have a mechanical resonance corresponding with the center frequency of a particular channel. Again, each of the elements is provided with circuitry and sensing elements not shown.

In FIG. 5, the incoming radiation 40, again, multichanneled as described in the two preceding figures, is, in this instance, caused to be incident on successive conductor element 41, 42 and 43 by deflector element 44 which causes the beam to scan the detectors. For illustrative purposes, beam positions are shown as **45*a*, 45*b* and 45*c*. Deflector element 44** may, for examples, be an acousto-optic deflector, in which event scanning is accomplished by introduction of an acoustic signal of appropriate amplitude and frequency by transducer means not shown. In the alternative, it may operate on any other principle as, for example, by periodic variation of refractive index through an electro-optic interaction. Literature references to suitable deflector elements are represented by Vol. 1, *IEEE Journal of Quantum Electronics*, 191 (1965) and Vol. 54, *Proceedings of IEEE*, 1391 (1968).

It is, of course, a requirement of element 44 and associated circuitry, not shown, that scanning be accomplished at a rate substantially greater than that of the highest channel frequency. The requirement for multiple detection is simply that the scan rate be such that each element is irradiated at least once during each pulse or cycle of its subcarrier channel. While the figure depicts a single deflector, more sophisticated arrangements may utilize both *x* and *y* deflection and a two-dimensional detector array. Another mode of operation utilizes the deflector 44 as a switching element simply for selecting one or another of elements 41, 42 or 43.

The arrangements of the figures are illustrative of the many uses to which the narrow-band detector elements of the invention may be adapted. Regardless of the use to which the detectors are put, in their most fundamental sense, they are merely simple detector elements which convert radiation modulation to electrical signals. The electrical signal may be utilized to stabilize oscillators by use of feedback, the detector elements may replace tank circuits in many uses as, for example, in successive IF stages in heterodyne circuits, etc.

2. Material Considerations

It has been noted that suitable crystalline materials for the inventive applications need not be pyroelectric. In fact, the sole primary requirement is that the material have sufficient piezoelectric response to produce a usable output. Ancillary requirements, of course, include absorption for the radiation of concern (this absorption may be induced by means of appropriate coatings, for example, of deposited metal or carbon, and may be enhanced by cavitation). Other requirements, which will be recognized by those familiar with the involved technology, preferably include high acoustic Q. It is generally desirable that such Q be high, for example, of the order of at least 50, such high Q values resulting in concomitant narrow bandwidth. Certain uses, however, where somewhat broader bandwidth is desired, may make use of values below this preferred level, for example, of the order of 25 or less. As with other mechanical resonators, there are occasions upon which pure molding and/or temperature stabilization may be desirable. Fortunately, there is available a larger array of suitable piezoelectric materials, selected members of which offer properties appropriate to any of the suggested uses.

An examplary material is lithium tantalate which may be pure moded and which may also show a particularly small dependence on temperature variation as well as high piezoelectric coupling coefficient. Other materials include lithium niobate, quartz, zinc oxide, and cadmium sulfide.

3. Structural Considerations

It is not appropriate to this description to describe in any detail the considerations germane to design of crystal elements exhibiting appropriate resonant characteristics. Fortunately, such considerations are treated at some length in texts such as *Piezoelectric Crystals and Their Applications to Ultrasonics* by W.P. Mason (Van Nostrard 1950). In general, practical devices utilizing available crystalline sections may be designed to have fundamental extensional resonance frequencies over the range of from about 100 kHz. to 1 GHz. Other modes may be utilized to define other resonances, for example, flectural modes for practical crystal sizes may have fundamental resonance frequencies of from about 1 kHz. to about 10 kHz. Use may also be made of harmonics to further extend the frequency range.

More detailed design considerations take other parameters into account. For example, as with pyroelectric detectors, use may be made of face electrodes or edge electrodes. Selection of optimum configurations depend on well-known considerations, e.g., preferred piezoelectric axes and detector responsivity, electrical impedance, etc.

4. Example

In this arrangement, a crystal of lithium tantalate of dimensions 4 mm by 1 mm by 0.02 mm freely suspended by 1 mil diameter bent wire leads was housed within a cavity of the general configuration shown in FIG. 1. Radiation of 10.6 microns wavelength produced by a $CO_2$ laser irradiating the entire area of the detector was detected at a power level of about 100 milliwatts. In this instance, face electrodes of evaporated gold of such thickness as to be semitransparent to the said radiation were utilized. The resulting piezoelectric response was measured as a function of modulation frequency by means of a field effect transistor amplifier. A frequency scan revealed the bandwidth to be approximately 3 kHz. This response corresponded with an extensional resonance mode for the crystal. Peak response was approximately 30 dB above the response 20 kHz. below resonance.

As is characteristic of the devices of the invention, the noise bandwidth was the same as the signal bandwidth.

While description has been in terms of visible and near-visible electromagnetic radiation detection, devices of the invention may be utilized with equal advantage in the detection of any other radiation which produces a temperature change in the detector element. In such use, detection continues to be narrow band so, for example, particle detection elements of the class described herein are selectively responsive to particular particle repetition rates.

What is claimed is:

1. Apparatus for converting radiation into an electrical signal comprising, at least one element which when irradiated absorbs at least a portion of the said radiation to produce a concomitant temperature variation, characterized in that said element is a piezoelectric crystal substantially freely suspended so as to evidence a mechanical resonance such that irradiation with energy modulated at a frequency approximating that of the said resonance is converted to the said electrical signal via piezoelectric coupling.

2. Apparatus of claim 1 in which the said element has an electromechanical coupling coefficient of at least 5 percent.

3. Apparatus of claim 2 in which the said element has an acoustic Q of at least 50.

4. Apparatus of claim 3 in which the said element consists essentially of $LiTaO_3$.

5. Apparatus of claim 1 including at least two of the said elements, each evidencing differing mechanical resonances.

6. Apparatus of claim 5 in which said elements are simultaneously irradiated by the said radiation.

7. Apparatus of claim 5 in which said elements are sequentially irradiated.

8. Apparatus of claim 7 in which said sequential irradiation is produced by successive reflection and absorption.

9. Apparatus of claim 7 in which said sequential irradiation is accomplished by deflection of the said radiation.

10. Apparatus of claim 9 in which said deflection is due to an acousto-optic interaction.

11. Apparatus of claim 10 in which said deflection is continuously varied.

12. Apparatus of claim 11 in which said deflection is in two orthogonal directions.

* * * * *